United States Patent [19]

Roussey et al.

[11] Patent Number: 5,030,884
[45] Date of Patent: * Jul. 9, 1991

[54] AUTOMOTIVE VEHICLE DAYTIME RUNNING LIGHT CIRCUIT

[75] Inventors: James L. Roussey, Fort Wayne; Merrill D. Miller, Huntington, both of Ind.

[73] Assignee: Navistar International Transportation Corp., Chicago, Ill.

[*] Notice: The portion of the term of this patent subsequent to Aug. 14, 2007 has been disclaimed.

[21] Appl. No.: 577,842

[22] Filed: Aug. 31, 1990

Related U.S. Application Data

[63] Continuation of Ser. No. 124,734, Jan. 21, 1988, abandoned.

[51] Int. Cl.$^5$ .............................................. B60Q 1/04
[52] U.S. Cl. ...................................... 315/83; 315/82; 315/191; 307/10.8
[58] Field of Search ................. 315/80, 82, 78, 83, 315/191; 307/10.8

[56] References Cited

U.S. PATENT DOCUMENTS

| | | | |
|---|---|---|---|
| 1,130,969 | 3/1915 | Fleet | 315/191 |
| 1,222,215 | 4/1917 | Klein | 315/191 |
| 1,269,954 | 6/1918 | Nigh | 315/80 |
| 3,068,378 | 12/1962 | Bishop et al. | 315/80 |
| 3,391,301 | 7/1968 | Poznik | 315/83 |
| 4,684,819 | 8/1987 | Haag et al. | 307/10 R |
| 4,686,423 | 8/1987 | Eydt | 315/80 |
| 4,713,584 | 12/1987 | Jean | 315/83 |
| 4,723,095 | 2/1988 | Svazas et al. | 315/83 X |
| 4,928,036 | 5/1990 | Abboud | 315/82 |

Primary Examiner—Eugene R. LaRoche
Assistant Examiner—Do Hyun Yoo
Attorney, Agent, or Firm—Dennis K. Sullivan

[57] ABSTRACT

A daytime running light circuit is integrated with the existing headlight circuit of an automotive vehicle. The daytime running light circuit functions to automatically illuminate the headlights at reduced intensity when the vehicle is running and the headlight switch is turned off. Any time, however, that the headlight switch is turned on, the headlights are illuminated at full intensity. The daytime running light circuit includes a day relay and a night relay. The night relay is responsive to the headlight switch being turned on for preventing operation of the daytime relay which would otherwise illuminate the headlamps at reduced intensity if the vehicle were running and the headlight switch off. When the headlight switch is off, the night relay enables the day relay to be operated whenever the vehicle is running. Indication that the vehicle is running is obtained from the alternator "R" terminal. The alternator "R" terminal signal may be further conditioned by sensing the status of one or more devices on the vehicle, such as the parking brakes or transmission, so that the day relay is operated by the alternator "R" terminal voltage signal only if all these one or more other devices indicate that the vehicle is not incapable of motion.

18 Claims, 1 Drawing Sheet

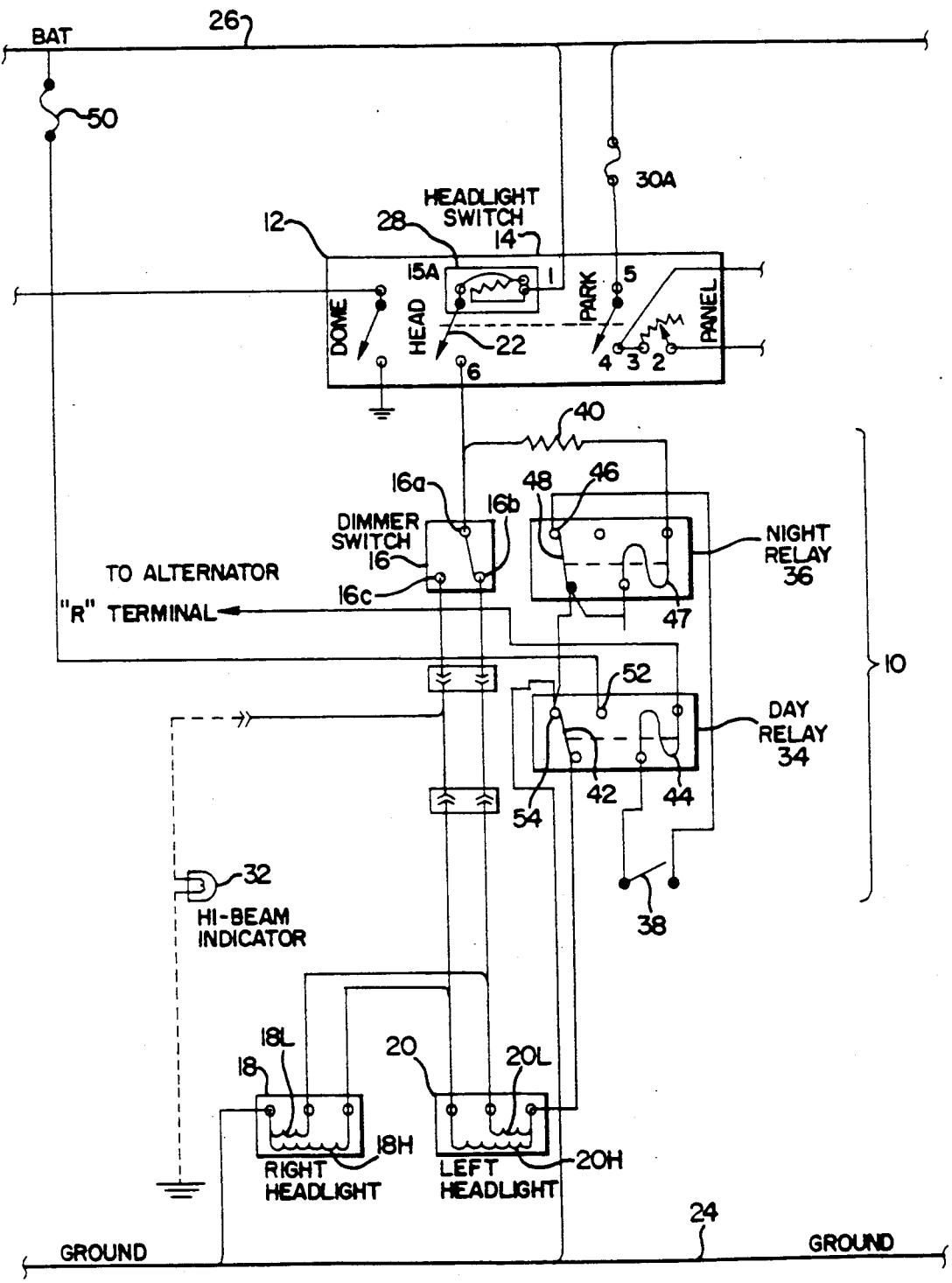

5,030,884

AUTOMOTIVE VEHICLE DAYTIME RUNNING LIGHT CIRCUIT

This application is a continuation of application Ser. No. 07/124,734, filed Jan. 21, 1988, and now abandoned.

CROSS-REFERENCE TO RELATED APPLICATION

This application is related to U.S. patent application Ser. No. 223,817 filed July 25, 1988, now U.S. Pat. No. 4,949,012 dated Aug. 14, 1990, and assigned to the assignee hereof.

BACKGROUND AND SUMMARY OF THE INVENTION

This invention relates generally to automotive vehicle electrical circuits. More specifically, it relates to an electrical circuit that creates daytime running lights by automatically illuminating the vehicle's headlights at reduced intensity when the vehicle is running and the headlight switch is off.

Running lights have been used on automotive vehicles for many years. Running lights on the exterior of the vehicle are connected in circuit with a switch on the interior of the vehicle that is under the control of the vehicle operator. In a truck or highway tractor, these lamps, which are sometimes called clearance, or marker, lamps, are illuminated whenever the operator turns the headlight switch on to illuminate the parking lights and/or the headlights. As such, these clearance, or marker, lamps are actuated to function principally as nighttime running lights because they are illuminated only at times when the parking lights or headlights are turned on. In the past, government regulations have established certain criteria for the operation and performance of such nighttime running lights.

Further extensions of government regulation mandate daytime running light systems on automotive vehicles. In general, these extensions of the regulations require the automatic illumination of daytime running lamps whenever the vehicle is running. Compliance can be accomplished either by placing additional lamps on the vehicle that are devoted exclusively to daytime running or by utilizing presently existing exterior lamps and making appropriate circuit modifications to assure proper daytime illumination intensity. For example, it is contemplated that operation of a vehicle's existing headlights at reduced voltage can provide suitable daytime running illumination intensity.

The incorporation of additional lamps which function exclusively as daytime running lights is probably the simplest to implement from an electrical circuit standpoint. However, other considerations make this approach undesirable, especially for vehicles which have already been designed. First, new lamps must be fabricated and mounted at suitable locations on the existing vehicle. This will undoubtedly require extensive design and re-tooling services. The additional lamps are also a significant added cost. Therefore, the utilization of a vehicle's existing lamps, such as the headlights, is preferable for incorporating the daytime running light feature.

Unfortunately, this more desirable approach tends to complicate the electrical circuitry that is used. This is because the integration of the daytime running light function must not interfere with other functions that are to be performed by the particular lamps chosen to perform daylight running. Thus, operation of the headlights at reduced illumination intensity to provide daytime running lights must not otherwise interfere with the ability of the headlights to be turned on at full intensity by the headlight switch, nor interfere with the high beam/low beam operation of the headlamps.

While the extended government regulations are addressed to newly manufactured vehicles, the possibility of retrofitting vehicles already in service is a consideration in the implementation of a daytime running light circuit. A circuit that can be compactly packaged and conveniently installed in existing vehicles is a desirable attribute.

Certain published regulations concerning daytime running lights are generally stated as requiring daytime running lights to be automatically turned on whenever the vehicle is running and the headlight switch is off. However, no specific means are given for how these two conditions, i.e. vehicle running and headlight switch off, are to be sensed, nor how the desired running light function is to be performed in consequence of these two conditions.

The present invention relates to a daytime running light circuit that is especially well suited for integration with existing exterior illumination systems of an automotive vehicle, and specifically in the disclosed embodiment, integration with the existing headlight circuit of the vehicle. Accordingly, the invention is readily compatible both as original equipment in new vehicles and for retrofit of many vehicles already in service. Moreover, the circuit of the present invention can be fabricated with a comparatively small number of conventional individual circuit devices. These devices can be conveniently packaged for expeditious installation in both new and older vehicles. The invention possesses novel and unique features which individually and collectively contribute to its attributes.

The circuit of the invention contemplates a unique means for sensing running of the vehicle. Contemporary automotive electrical systems comprise alternators, driven by the engine, that produce the electrical power for the electrical systems. The alternator output is operatively coupled by means of a regulator with the vehicle battery, or batteries, to maintain proper charge. A typical automotive alternator has a further terminal that is commonly referred to as the "R" terminal, and it is this "R" terminal that is used in the present invention to provide an indication that the vehicle is running.

When the alternator is being driven, a certain voltage is present at the "R" terminal. For a twelve-volt alternator, the "R" terminal output is six volts. But this voltage is present at the "R" terminal only after the engine has been started and is running. In other words, during the engine start cycle, no voltage is present at the "R" terminal, and it is only after the engine is running on its own and driving the alternator that voltage appears at the "R" terminal. The present invention advantageously utilizes this "R" terminal voltage as an indicator of vehicle running.

However, the fact that the engine is running is not necessarily conclusive that the vehicle is in motion. For example, the vehicle may be parked with the engine running, and in such a case, it may be deemed unnecessary to operate the daytime running lights. Accordingly, extended regulations have recognized that the daytime running lights need not necessarily come on until the vehicle transmission is placed in gear and/or an associated parking brake is released.

The circuit of the present invention utilizes the voltage at the alternator "R" terminal as an indication of running of the vehicle, and depending upon whether it is desired to illuminate the headlights while the engine is running and the vehicle parked, provision may be made for also interlocking the daytime running light circuit with associated transmission and/or parking brake switch(es).

The disclosed embodiment of the invention comprises essentially two relays, a switch, and a resistor for integration with the existing headlight circuit of the vehicle. Use of such a comparatively few number of components helps to keep down the cost of incorporating the daytime running light feature. The particular manner in which the circuit is organized and arranged with the existing headlight filaments serves to reduce the filament voltage to an appropriate level for meeting daytime illumination intensity requirements without the wastefulness that would be associated with use of additional voltage-reducing resistors or incorporation of a chopper circuit.

The foregoing features, advantages and benefits of the invention, along with additional ones, will be seen in the ensuing description and claims which should be considered in conjunction with the accompanying drawing. The drawing discloses a presently preferred embodiment in accordance with the best mode contemplated at the present time in carrying out the invention.

BRIEF DESCRIPTION OF THE DRAWING

The single drawing FIGURE is an electrical schematic diagram of circuit embodying principles of the invention.

DESCRIPTION OF THE PREFERRED EMBODIMENT

The drawing FIGURE shows a daytime running light circuit, 10 generally, in association with an automotive vehicle headlight circuit, 12 generally.

Headlight circuit 12 comprises a conventional headlight switch 14, a dimmer switch 16, and right and left dual filament headlights 18 and 20 respectively.

Headlights 18 and 20 are powered from the vehicle's D.C. electrical power supply through a switch portion 22 of headlight switch 14. (Although the drawing FIGURE portrays other switch portions of headlight switch 14, they do not relate to the present invention.) One of the D.C. power supply terminals is ground 24, and the ungrounded terminal of the power supply is identified by the reference 26.

The ungrounded terminal 26 connects through an internal circuit breaker 28 in headlight switch 14 to one side of switch portion 22. The other side of switch portion 22 connects to the common terminal 16a of dimmer switch 16. Dimmer switch 16 is selectively operable to low beam and high beam positions respectively. The drawing FIGURE shows dimmer switch 16 in the low beam setting with terminal 16a being connected to low beam terminal 16b. In this setting the low beam filaments 18L, 20L of headlights 18 and 20 are selected. In the high beam setting of dimmer switch 16, terminal 16a is connected to high beam terminal 16c causing the high beam filaments 18H, 20H to be selected.

It is typical to place a high beam indicator lamp on the vehicle instrument panel for illumination to indicate high beam filament operation. Accordingly, the circuit comprises such a high beam indicator lamp 32 connected between the high beam output terminal 16c of dimmer switch 16 and ground 24 so that whenever the high beam filaments are energized through dimmer switch 16, high beam indicator lamp 32 is too.

Both headlights 18 and 20 have a common terminal for their high and low beam filaments. The drawing FIGURE shows the common terminal for right headlight 18 connected directly to ground 24. The common terminal o( left headlight 20, however, is not continually connected to ground. Rather, it is connected through a portion of daytime running light circuit 10 in such a manner that its connection to ground is selectively controlled in accordance with whether or not circuit 10 is commanding the headlights to daytime running light operation.

Circuit 10 comprises a day relay 34, a night relay 36, a park switch 38, and a resistor 40. The condition portrayed by the schematic diagram is for headlight switch 14 off (i.e. switch portion 22 open) and for the daytime running lights not illuminated. In this condition the common terminal of headlight 20 is grounded through a movable contact 42 of day relay 34. Accordingly, the two headlights 18 and 20 form a parallel load which is connected directly across the power supply by closure of switch portion 22. In other words, the headlights can be turned on and off in the usual manner by turning switch portion 22 of headlight switch 14 on and off, the particular headlamp beam, either high beam or low beam, being selected by the setting of dimmer switch 16.

Daytime running light circuit 10 functions to illuminate headlights 18 and 20 at reduced intensity when the vehicle is running and switch portion 22 of headlight switch 14 is open.

One of the features of circuit 10 relates to the manner in which vehicle running is sensed. According to this aspect of the invention, the alternator "R" terminal is used to provide the principal indication that the vehicle is running. In the case of a twelve-volt alternator, its "R" terminal will develop a six-volt output signal, but only after the engine has been started and is running under its own power. While the appearance of such a voltage at the alternator "R" terminal may be directly used as the exclusive indicator that the vehicle is running, the mere fact that the engine has been started and is running does not necessarily mean that the vehicle is, in fact, capable of motion. Accordingly, while this aspect of the invention contemplates that the alternator "R" terminal voltage be used as the primary indication that the vehicle is running, such signal may be conditioned by one or more indicators of motion, such as release of an associated parking brake and/or placement of the transmission in a drive gear. In the illustrated embodiment, switch 38 is a park switch that serves to condition the "R" terminal voltage such that the "R" terminal voltage will not be effective on circuit 10 until such time as the vehicle is placed in a drive gear causing switch 38 to close. In other words, switch 38 is open when the vehicle transmission is not in a drive gear.

Day relay 34 comprises a six-volt coil 44 which controls movable contact 42. One side of coil 44 is connected to the alternator "R" terminal. The other side of coil 44 connects through switch 38 to a terminal 46 of night relay 36.

Night relay 36 comprises a twelve-volt coil 47 and a movable contact 48. One side of coil 47 connects through resistor 40 to switch portion 22 of headlight switch 14. The other side of coil 47 connects to ground 24. With this arrangement, coil 47 is de-energized whenever switch portion 22 is open but it is energized whenever switch portion 22 is closed. As such, night relay 36 in effect senses whether the headlight switch is operating the headlights on or off.

With the headlight switch off and coil 47 de-energized, terminal 46 connects through movable contact 48 to ground. This causes ground to be applied through switch 38 to one side of coil 44 of day relay 34. Hence, when the engine has been started and is running to produce "R" terminal voltage, and the transmission is placed in gear to close switch 38, coil 44 becomes energized. The energization of coil 44 operates movable contact 42 so that the ground which had previously existed at the common terminal of left headlight 20 is replaced by voltage from the ungrounded power supply terminal 26 that is supplied through a suitable fuse 50 to a terminal 52 of day relay 34 with which movable contact 42 is made once coil 44 is energized.

The two headlights 18 and 20 now become a series load across the power supply with energizing current for the headlight filaments flowing through fuse 50, contact 42, and through the now series connected headlamp filaments to ground 24. In a twelve-volt system this results in approximately six volts being applied across each headlight with the consequent illumination of each headlight at an intensity that is appreciably reduced from the full intensity which it would otherwise exhibit if energized by a full twelve volts. Accordingly, automatic daytime running light illumination of the headlights is accomplished and will continue until such time as either the vehicle is parked to open switch 38, the engine is shut off to remove the "R" terminal voltage from relay coil 44, or the headlamp switch is turned on to command full illumination of the headlamps.

When the headlamp switch is operated to illuminate the headlights at full intensity, closure of switch portion 22 serves to energize coil 47 of night relay 36. In consequence, contact 48 is operated to remove the ground from switch 38 causing coil 44 of day relay 34 to immediately de-energize. Accordingly, contact 42 returns to engage terminal 54 to cause ground 24 to be applied to the common terminal of left headlight 20. The ultimate result is that both headlights 18 and 20 now are returned to a circuit condition where they form parallel loads on headlight switch 22 so that each illuminates at full intensity.

Thus, daytime running light circuit 10 provides for the automatic daytime illumination of the headlights at reduced intensity for daytime visibility purposes without interfering with the regular headlight circuit operation that operates the headlamps at full intensity whenever the headlight switch is turned on to close switch portion 22.

Based upon the foregoing description, it can be appreciated that the invention can be embodied with relatively few components and it is adaptable for installation both as original equipment in a new vehicle and for retrofit purposes in vehicles already in service. The purpose of using resistor 40 (a 22 ohm, ½ watt device), is to prevent the night relay coil from being energized as the daytime running lights are first being turned on. Due to different characteristics between the respective right and left headlamp filaments during initial warmup, the possibility that a voltage could be fed back through the dimmer switch to accidentally energize night relay coil 47 is precluded by the presence of resistor 40. However, the resistor does not interfere with the intended energization of coil 47 when the headlights are turned on from switch 14.

In addition to the aforementioned advantages, the illustrated daytime running light circuit possesses a functional advantage in relation to the headlight circuit. One of the headlights, the right headlight in this case, is always connected between ground and dimmer switch 16. Therefore, at least it can be illuminated at full intensity by turning the headlamp switch on.

While a preferred embodiment of the invention has been illustrated and described, it will be appreciated that the principles of the invention are applicable to other embodiments.

What is claimed is:

1. In an automotive vehicle having an engine that powers the vehicle and an electrical system that includes an alternator driven by the engine, said alternator having a particular terminal at which an energizing potential is presented only after the engine has been started and is running, a daytime running light circuit, including an exterior illumination lamp system for providing daytime running light illumination, and means for automatically turning the exterior illumination lamp system on when the vehicle is running, said daytime running light circuit comprising switch means for turning said exterior illumination lamp system on and off, and means responsive to the presence of energizing potential at said particular alternator terminal and acting on said switch means to cause said exterior illumination system to emit daytime running light illumination, said exterior illumination lamp system comprising the right and left headlights of the vehicle that are a part of the vehicle's headlight circuit which also includes a headlight switch for turning the headlights on and off, and wherein said daytime running light circuit is organized and arranged in association with the vehicle's headlight circuit such that operation of the headlight switch to turn the headlights on will illuminate the headlights at full rated intensity while operation of the daytime running light circuit, when the headlight switch is off, will automatically illuminate the headlights at reduced intensity to thereby provide daytime running light illumination, said daytime running light circuit comprising means for connecting the headlights as a series load in a circuit that excludes said headlight switch across a voltage for producing daytime running light illumination and means for connecting the headlights via said headlight switch as a parallel load across said voltage when the headlight switch is turned on.

2. A daytime running light circuit as set forth in claim 1 in which said means responsive to the presence of energizing potential at said particular alternator terminal and acting on said switch means to cause said exterior illumination system to emit daytime running light illumination includes conditioning means responsive to a device on the vehicle that is an indicator of the vehicle not being incapable of motion such that the presence of energizing potential at said particular alternator terminal causes said exterior illumination lamp system to illuminate at daytime running light illumination when said conditioning means indicates that the vehicle is not incapable of motion.

3. A daytime running light circuit as set forth in claim 2 in which said conditioning means comprises a switch that is associated with the transmission of the vehicle for indicating that the transmission is in a drive gear and thereby capable of motion.

4. A daytime running light circuit as set forth in claim 1 in which said means responsive to the presence of energizing potential at said particular alternator terminal and acting on said switch means to cause said exterior illumination system to emit daytime running light illumination comprises a relay having a coil that is selectively energized by the presence of energizing potential at said particular alternator terminal and when energized acts on said switch means to cause said exterior illumination lamp system to provide daytime running light illumination.

5. A daytime running light circuit as set forth in claim 1 in which said particular terminal at which energizing potential is presented only after the engine has been started and is running is the terminal (hat is commonly referred to as the alternator "R" terminal.

6. A daytime running light circuit as set forth in claim 1 in which said daytime running light circuit comprises a day relay and a night relay, said day relay comprising a coil that is responsive to the presence of energizing potential at said particular alternator terminal and said night relay comprising a coil that is responsive to the headlight switch being turned on.

7. In an automotive vehicle having an engine that powers the vehicle and an electrical system that includes an alternator driven by the engine, said alternator having a particular terminal at which an energizing potential is presented only after the engine has been started and is running, a daytime running light circuit, including an exterior illumination lamp system for providing daytime running light illumination, and means for automatically turning the exterior illumination lamp system on when the vehicle is running, said daytime running light circuit comprising switch means for turning said exterior illumination lamp system on and off, and means responsive to the presence of energizing potential at said particular alternator terminal and acting on said switch means to cause said exterior illumination system to emit daytime running light illumination, said exterior illumination lamp system comprising the right and left headlights of the vehicle that are a part of the vehicle's headlight circuit which also includes a headlight switch for turning the headlights on and off, and wherein said daytime running light circuit is organized and arranged in association with the vehicle's headlight circuit such that operation of the headlight switch to turn the headlights on will illuminate the headlights at full rated intensity while operation of the daytime running light circuit, when the headlight switch is off, will automatically illuminate the headlights at reduced intensity to thereby provide daytime running light illumination, said daytime running light circuit comprising means for connecting the headlights as a series load across a voltage for producing daytime running light illumination and means for connecting the headlights via said headlight switch as a parallel load across said voltage when the headlight switch is turned on, said daylight running light circuit comprising a day relay and a night relay, said day relay comprising a coil that is responsive to the presence of energizing potential at said particular alternator terminal and said night relay comprising a coil that is responsive to the headlight switch being turned on, in which said day relay and said night relay are organized and arranged in circuit relationship such that when said day relay coil is energized and said night relay coil is not energized, said headlights are connected as a series load across said voltage, and when said night relay coil is energized and said day relay coil is not energized, said headlights are connected as a parallel load across said voltage.

8. In combination with an automotive vehicle headlight circuit that comprises a pair of headlights and a headlight switch that is turned on and off and operatively related to said headlights such that when on, each headlight is operated at its rated voltage and intensity, a daytime running light circuit comprising means providing a signal indicative of vehicle running, and means responsive to said signal and to said headlight switch being off for causing each headlight to operate at substantially one-half its rated voltage whereby each headlight will automatically illuminate at appreciably less than its rated intensity whenever the vehicle is running and the headlight switch is off to thereby provide daytime running light illumination, but operation of the headlight switch to on will operate each headlamp at rated voltage and intensity, in which said means responsive to said signal and to said headlight switch being off for causing each headlight to operate at substantially one-half its rated voltage comprises a first relay having a coil and a movable contact that is connected in circuit with one of said headlights on a side thereof opposite the side to which the headlight switch is connected, said movable contact being operable to a condition that places both headlights as a series load across a source of voltage when said signal is given and said headlight switch is off.

9. A daytime running light circuit as set forth in claim 8 including a second relay having a coil that is responsive to the headlight switch being on and a movable contact that is operated by said coil of the second relay in response to the headlight switch being on for preventing operation of the coil of the first relay and thereby preventing the movable contact of the first relay from connecting the headlights as a series load across said source of voltage.

10. A daytime running light circuit as set forth in claim 9 in which a circuit element is connected between the coil of the second relay and the headlight switch for preventing feed-back voltage from the headlights from accidentally operating the coil of the second relay when the headlight switch is off and the coil of the first relay is operated.

11. A daytime running light circuit as set forth in claim 8 in which said means providing a signal indicative of vehicle running comprises means responsive to the presence of energizing potential at the "R" terminal of an alternator that is driven by an engine that powers the automotive vehicle.

12. A daytime running light circuit as set forth in claim 11 in which said means providing a signal indicative of vehicle running also includes conditioning means responsive to a device on the vehicle that is an indicator of the vehicle not being incapable of motion such that the presence of energizing potential at said "R" terminal causes each headlamp to operate at substantially one-half its rated voltage when said conditioning means indicates that the vehicle is not incapable of motion.

13. A daytime running light circuit as set forth in claim 12 in which said conditioning means comprises a switch that is associated with the transmission of the vehicle for indicating that the transmission is in a drive gear and thereby capable of motion.

14. In combination with an automotive vehicle headlight circuit that comprises a pair of headlights and a headlight switch that is turned on and off and operatively related to said headlights such that when on, said headlights are connected in parallel with each other and across a source of electrical potential such that each headlight is operated at its rated voltage and intensity, a daytime running light circuit comprising means providing a signal indicative of vehicle running, and means responsive to said signal and to said headlight switch being off for causing said pair of headlights to be connected in series with each other and across said source of electrical potential whereby each headlight will illuminate at appreciably less than its rated intensity when the vehicle is running and the headlight switch is off to thereby provide daytime running light illumination, while full intensity illumination of each headlight can be attained at any time by turning the headlight switch on, in which said means responsive to said signal and to said headlight switch being off for causing each headlights to be connected in series with each other and across said source of electrical potential comprises a first relay having a coil and a movable contact that is connected in circuit with one of said headlights on a side thereof opposite the side to which the headlight switch is connected, said movable contact being operable to a condition that places both headlights as a series load across a source of voltage when said signal is given and said headlight switch is off.

15. A daytime running light circuit as set forth in claim 14 in which said means providing a signal indicative of vehicle running comprises means responsive to the presence of energizing potential at the "R" terminal of an alternator that is driven by an engine that powers the automotive vehicle.

16. A daytime running light circuit as set forth in claim 15 in which said means providing a signal indicative of vehicle running also includes conditioning means responsive to a device on the vehicle that is an indicator of the vehicle not being incapable of motion such that the presence of energizing potential at said "R" terminal causes each headlamp to operate at substantially one-half its rated voltage when said conditioning means indicates that the vehicle is not incapable of motion.

17. A daytime running light circuit as set forth in claim 14 including a second relay having a coil that is responsive to the headlight switch being on and a movable contact that is operated by said coil of the second relay in response to the headlight switch being on for preventing operation of the coil of the first relay and thereby preventing the movable contact of the first relay from connecting the headlights as a series load across said source of voltage.

18. A daytime running light circuit as set forth in claim 17 in which a circuit element is connected between the coil of the second relay and the headlight switch for preventing feed-back voltage from the headlights from accidentally operating the coil of the second relay when the headlight switch is off and the coil of the first relay is operated.

* * * * *